Feb. 17, 1942.    W. J. BOYER    2,273,692
FASTENING
Filed July 3, 1939

INVENTOR
William J. Boyer, deceased
By Frederick G. L. Boyer, Administrator

Patented Feb. 17, 1942

2,273,692

UNITED STATES PATENT OFFICE 2,273,692

FASTENING

William J. Boyer, deceased, late of Wilmington, Del., by Frederick G. L. Boyer, administrator, Hamilton, Ohio, assignor to Frederick G. L. Boyer, Hamilton, Ohio Application July 3, 1939, Serial No. 282,712

7 Claims. (Cl. 152—237)

This invention relates to attachments between straps and metal parts and is particularly useful in devices for holding the so-called "emergency" type of anti-skid chains onto a tire and rim.

The primary object of the invention is to provide a fastening which is strong and secure and which will be much more durable than fastenings of the usual types. A further object is to provide intermediate means which will take a large part of the strain off of the fastening proper and thus greatly increase the strength of the fastening as a whole. Other and more detailed objects of the invention will be apparent from the following description.

The nature of the invention will be better understood by reference to the accompanying drawing in which.

Figure 1:
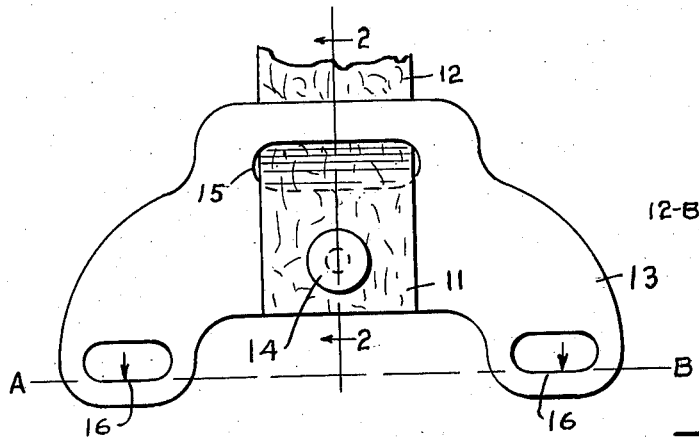
Fig. 1 is a side view of a strap fastened to a cross chain connecting plate in accordance with the present invention.
Figure 2:
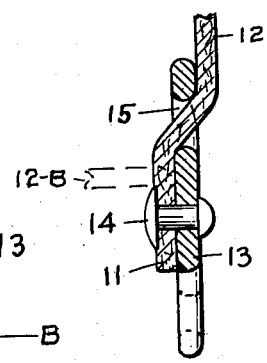
Fig. 2 is a sectional view taken on line 2—2 of Fig. 1.

By reference to Figs. 1 and 2 it will be seen that the end 11 of the strap 12 is attached to the plate 13 by any convenient means, advantageously a large headed rivet 14 or a rivet and washer although other known methods of attachment may be used.

This rivet fastening alone is subject to several weaknesses. The sectional area of the strap in tension is seriously reduced by the rivet hole. Otherwise, straight tension may pull the rivet out the end of the strap. Further the strap is liable to bending at the rivet as indicated at 12B by broken lines in Fig. 2, and repeated bending at the rivet still further weakens the part of least area so that failure soon occurs.

According to the present invention the strap is passed through a slot 15 near the rivet, or equivalent fastening, as clearly shown in Fig. 2. This serves to hold the strap parallel to the plate between the rivet and the slot thus preventing bending of the strap at the rivet where bending would do most damage.

After passing through the slot 15 strap 12 continues in a direction approximately parallel to plate 13 as clearly shown in Fig. 2. The width of slot 15 is so related to the thickness of strap 12 that a relatively sharp reverse bend is imparted to the strap. This gives rise to a snubbing action, when tension is applied to the strap and opposed by forces applied to plate 13 at bearing points 16—16. This snubbing action carries a large part of the load thus relieving the rivet fastening of this part of the load and bringing about a corresponding increase in the load which can be carried, over and above what could be carried by a rivet fastening alone. Because the snubbing action takes place where the strap is of full width and full thickness the holding power of the fastening as a whole is substantially equal to the tensile strength of the strap.

It should be noted that the slot 15 lies in the direction of the strap extension both from the point of attachment, i. e. the rivet 14, and from the line A—B joining points 16—16 where the load is applied to plate 13. The greater the distance of slot 15 from the line A—B the more nearly will plate 13 and strap 12 be held in parallelism under tension.

It is frequently advantageous that the plate or other structure to which the strap is to be fastened should be formed by stamping, and as a consequence certain of the corners of the slot 15 tend to be cut sharp and may be somewhat rough. An attempt to snub the strap around such sharp rough corners would result in great danger of cutting or wearing the sides of the strap thus reducing the load carrying capacity and shortening the life of the fastening.

Figure 3:
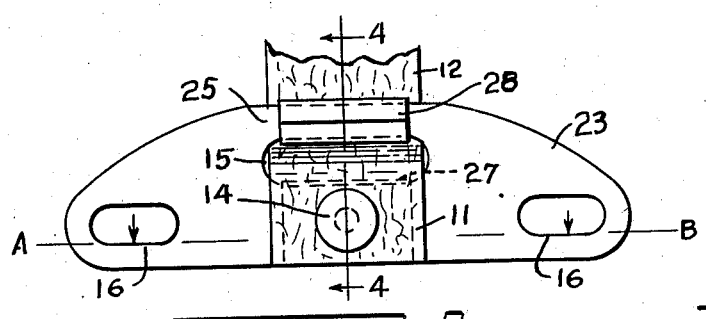
Fig. 3 is a similar view showing a strap fastened to a plate formed of a sheet metal stamping with guards provided for the sharp corners according to the present invention.
Figure 4:
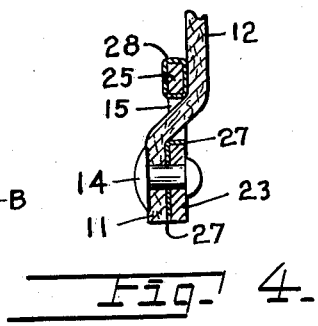
Fig. 4 is a sectional view on line 4—4 of Fig. 3.

In order to prevent wear of the strap by sharp corners of the slot, guards are provided, according to the present invention, which provide smooth, rounded, non-abrasive coverings for unsuitably sharp or rough corners. Figs. 3 and 4 show a structure in which the strap 12 is attached to a stamped plate 23. One of the sharp corners of slot 15 is covered by an L shaped piece of sheet metal 27 secured between plate 23 and end 11 of the strap by the rivet 14. The other sharp corner with which the strap comes in contact is covered by a sheet metal guard 28 which is bent around and advantageously completely encircles the part 25 of plate 23 which lies beyond slot 15. These sheet metal guards are advantageously made of soft steel which bends to a smooth edge. No matter how sharp the corner of the stamping 23 the outer surface of the guard presents a smooth rounded surface to the strap which is thereby protected from any damage at the corners of slot 15. This gives a structure with the advantages of simplicity and cheapness of production without sacrificing any of the strength or durability of the fastenings.

Figure 5:
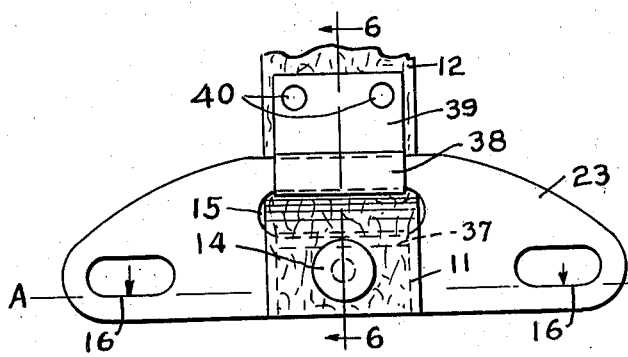
Fig. 5 is a view showing a modified form of guards.
Figure 6:
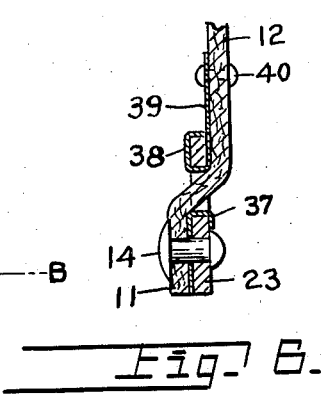
Fig. 6 is a sectional view taken on line 6—6 of Fig. 5.

A modified structure is illustrated in Figs. 5 and 6. This differs from the structure illustrated in Figs. 3 and 4 in the form of the sheet metal guard 38 which is substituted for guard 28 in Fig. 4. Guard 38 has an extension 39 which projects beyond plate 23 and is fastened to strap 12, as by rivets 40, serving to stiffen and under certain circumstances or conditions to strengthen the joint. The guard 37 which takes the place of guard 27 in Fig. 4, may if desired be bent around both corners to protect the strap during insertion.

The fastening of the present invention is admirably adapted to the fastening of emergency type anti-skid chains to a strap for holding them on a tire and rim but is equally useful wherever a simple, low cost, high strength fastening is desired for fastening a leather, reinforced rubber or other type of strap, to a metal plate or the like.

This application is a continuation-in-part of application Serial No. 38,479, filed August 29, 1935.

What is claimed is:

1. In an anti-skid chain structure, a cross chain connecting plate, a slot through said plate, a strap attached near its end to said plate, said strap extending from said fastening roughly parallel to the surface of the plate, thence turning and passing through said slot.

2. In an anti-skid chain structure, a cross chain connecting plate, a cross chain connected to said plate near each end thereof and extending in one general direction therefrom, a strap for fastening the chain structure to a tire and rim, said strap being attached to said plate intermediate the two cross chains and extending generally in the opposite direction therefrom, a slot in said plate, said slot lying in the line of extension of said strap and a short but material distance in the direction of the strap extension both from the point of attachment of the strap and the line joining the points of connection with said cross chains, said strap passing through said slot.

3. An anti-skid chain structure comprising, in combination: a cross chain connection plate having a slot; a strap having an end passed through said slot; means for securing said end to the plate adjacent said slot; and a sheet metal member turned about an edge of said slot and underlying said strap to prevent wear of the strap by a sharp corner of the plate.

4. An anti-skid chain structure comprising, in combination: a cross chain connecting plate having a slot; a strap having an end passed through said slot and secured to a face of the plate adjacent the slot and sheet metal members turned about the respective inner edges of the plate as exposed in the slot and underlying the strap to prevent wear of the strap by sharp corners of the slot.

5. An anti-skid chain structure comprising, in combination: a cross chain connecting plate having a slot; a strap passed through said slot to lie upon opposite sides of the plate; an end of said strap secured to one face of the plate adjacent the slot; a sheet metal member passing through said slot with the strap, lying between the body of the strap and a face of the plate and turned about the material of the plate at one edge of the slot to completely surround said portion; a portion of said member extending from the plate in contact with and secured to the body of the strap to provide a second means for transferring strains of cross chains upon the plate, to the strap.

6. A fastening for attaching a strap to a metal plate, which comprises attaching means for firmly holding one end of said strap approximately flat against a substantially flat portion of said plate, and means for preventing any significant bending of the strap at said attaching means, said preventing means comprising a slot in said plate adjacent to but at a material distance from said attaching means, said strap passing from said attaching means along said plate thence through said slot with a reverse bend whereby diagonally opposite corners of the slot contact said strap between said attaching means and the point of application of load to said strap.

7. A fastening for attaching a strap to a cross chain connecting plate in an anti-skid chain structure, which comprises a straight edged slot in said plate, a positive attaching means for holding one end of said strap approximately flat against said plate adjacent to but at a material distance from said slot, said strap passing from said fastening along the surface of said plate to said slot then passing through said slot, being sharply bent in reverse directions over opposite corners thereof whereby a snubbing action is produced which relieves the positive attaching means of a considerable portion of any applied load.

FREDERICK G. L. BOYER,
*Administrator of the Estate of William J. Boyer, Deceased.*